Patented Feb. 6, 1951

2,540,680

UNITED STATES PATENT OFFICE 2,540,680

β-PYRIDYL CARBINOL ACID TARTRATE

Werner Maximillian Lauter, Glen Rock, N. J., assignor to Hoffmann-La Roche Inc., Nutley, N. J., a corporation of New Jersey No Drawing. Application December 30, 1948, Serial No. 68,426

1 Claim. (Cl. 260—297)

My invention relates to the new compound β-pyridyl carbinol acid tartrate. The product may be prepared as a crystalline salt. Its properties render it useful for therapeutic purposes, particularly as a vaso dilator.

β-Pyridyl carbinol, which is employed as a reagent in the synthesis of the novel tartrate, is itself a thin liquid of fairly low boiling point. We have found that this carbinol when reacted mol for mol with tartaric acid yields a stable monotartrate salt having the desirable properties mentioned above. The new salt has a relatively low solubility in methanol and a rather high solubility in water; it is non-hygroscopic, which property is of particular value in the preparation of tablets of the therapeutically active material.

Example

At room temperature 15.0 grams of tartaric acid are dissolved in 50.0 cc. of methanol and 10.9 grams of β-pyridyl carbinol are added. The clear solution begins to solidify within 10 to 15 seconds with evolution of heat. The mass is permitted to cool following which the solid material is filtered off and washed with 10 cc. methanol. The crystals thus obtained are dried at 80° C. The crystals may be purified by dissolving 10 grams thereof in a warm mixture of 25 cc. water and 75 cc. methanol. Upon cooling crystals of β-pyridyl carbinol acid tartrate are formed, which crystals are filtered and then washed with methanol to yield a final product, β-pyridyl carbinol acid tartrate, having a melting point of 147° C.

I claim:

β-Pyridyl carbinol acid tartrate.

WERNER MAXIMILLIAN LAUTER.

REFERENCES CITED

The following references are of record in the file of this patent:

UNITED STATES PATENTS

| Number | Name | Date |
|---|---|---|
| 597,454 | Bishop | Jan. 18, 1898 |

OTHER REFERENCES

Heilbron, Dictionary of Organic Compounds, vol. 3, pp. 556 and 552–553 (1943 edition), Oxford University Press, New York.

Certificate of Correction

Patent No. 2,540,680 February 6, 1951

WERNER MAXIMILLIAN LAUTER

It is hereby certified that error appears in the printed specification of the above numbered patent requiring correction as follows:

Column 1, line 10, strike out the words and period "itself a thin liquid of fairly low boiling point." and insert the same before "We have" in line 8, same column;

and that the said Letters Patent should be read as corrected above, so that the same may conform to the record of the case in the Patent Office Signed and sealed this 17th day of April, A. D. 1951.

[SEAL]

THOMAS F. MURPHY,
*Assistant Commissioner of Patents.*